United States Patent
Holtmann et al.

(10) Patent No.: US 10,060,524 B2
(45) Date of Patent: Aug. 28, 2018

(54) VARIABLE DISPLACEMENT PUMP AND GEARBOX CONTROL SYSTEM

(71) Applicant: Magna Powertrain Bad Homburg GmbH, Bad Homburg (DE)

(72) Inventors: Ludger Holtmann, Rosbach (DE); Thilo Mauser, Bad Vilbel (DE); Van Doan Nguyen, Neu-Anspach (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 0 days.

(21) Appl. No.: 14/895,408

(22) PCT Filed: Jul. 1, 2014

(86) PCT No.: PCT/EP2014/064002
§ 371 (c)(1),
(2) Date: Dec. 2, 2015

(87) PCT Pub. No.: WO2015/003960
PCT Pub. Date: Jan. 15, 2015

(65) Prior Publication Data
US 2016/0116059 A1    Apr. 28, 2016

(30) Foreign Application Priority Data
Jul. 8, 2013    (DE) .................... 10 2013 107 180

(51) Int. Cl.
*F03C 4/00*    (2006.01)
*F04C 2/00*    (2006.01)
(Continued)

(52) U.S. Cl.
CPC ......... *F16H 61/0267* (2013.01); *F04C 14/22* (2013.01); *F04C 14/223* (2013.01);
(Continued)

(58) Field of Classification Search
CPC ........ F04C 14/20; F04C 14/22; F04C 14/223; F04C 14/226; F04C 14/24; F04C 14/28;
(Continued)

(56) References Cited

U.S. PATENT DOCUMENTS

| | | |
|---|---|---|
| 5,875,630 A | 3/1999 | Walsh et al. |
| 6,012,907 A * | 1/2000 | Nguyen et al. ......... F04C 14/26 417/300 |
| 2005/0072160 A1 * | 4/2005 | Futa, Jr. et al. ...... F04C 14/226 417/220 |

FOREIGN PATENT DOCUMENTS

| | | |
|---|---|---|
| CN | 101321953 A | 12/2008 |
| CN | 101858340 A | 10/2010 |

(Continued)

OTHER PUBLICATIONS

Search Report dated Aug. 25, 2016 from corresponding Chinese Patent Application No. 201480032817.5.
(Continued)

*Primary Examiner* — Theresa Trieu
(74) *Attorney, Agent, or Firm* — Dickinson Wright PLLC

(57) ABSTRACT

A hydraulic transmission control system including a vane pump including a stroke ring defining a compartment. An outlet line and an inlet line are fluidly connected to the compartment. A control pressure chamber and a compensation chamber are defined adjacent to opposite sides of the stroke ring, each for varying a pump outlet pressure based on a pressure change within the chambers. A pump controller is connected to the outlet line and the pressure control chamber for adjusting a pressure in the pressure control chamber. The outlet line is further connected to the compensation chamber, a primary hydraulic circuit and a primary pressure control valve. A secondary hydraulic circuit is connected to the primary pressure control valve. A shift valve is disposed between the outlet line and the primary control valve and
(Continued)

configured to selectively connect the pump controller and the primary pressure control.

12 Claims, 6 Drawing Sheets

(51) Int. Cl.
*F04C 14/18* (2006.01)
*F16H 61/02* (2006.01)
*F04C 14/24* (2006.01)
*F04C 14/28* (2006.01)
*F04C 14/22* (2006.01)
*F16H 57/04* (2010.01)
*F16H 61/00* (2006.01)

(52) U.S. Cl.
CPC ............ *F04C 14/24* (2013.01); *F04C 14/28* (2013.01); *F16H 57/0446* (2013.01); *F16H 61/0025* (2013.01); *F04C 2240/81* (2013.01); *F04C 2270/025* (2013.01); *F16H 2061/0037* (2013.01)

(58) Field of Classification Search
CPC ............ F04C 2240/809; F04C 2240/81; F04C 2270/04; F04C 2270/041; F04C 2270/02; F04C 2270/025; F16H 61/0025; F16H 61/0267; F16H 57/0446
USPC ......... 418/24–31, 17, 40, 259–260; 417/219, 417/220, 228, 300
See application file for complete search history.

(56) References Cited

FOREIGN PATENT DOCUMENTS

| | | | |
|---|---|---|---|
| FR | 2826408 A1 | 12/2002 | |
| GB | 2383433 A * | 6/2003 | ............ B62D 5/062 |
| JP | H04171288 A | 6/1992 | |
| JP | 2003035280 A | 2/2003 | |
| WO | WO9828179 A1 | 7/1998 | |
| WO | WO2012149931 A2 | 11/2012 | |

OTHER PUBLICATIONS

International Search Report and Written Opinion dated Apr. 13, 2015 in International Patent Application No. PCT/EP2014/064002.

* cited by examiner

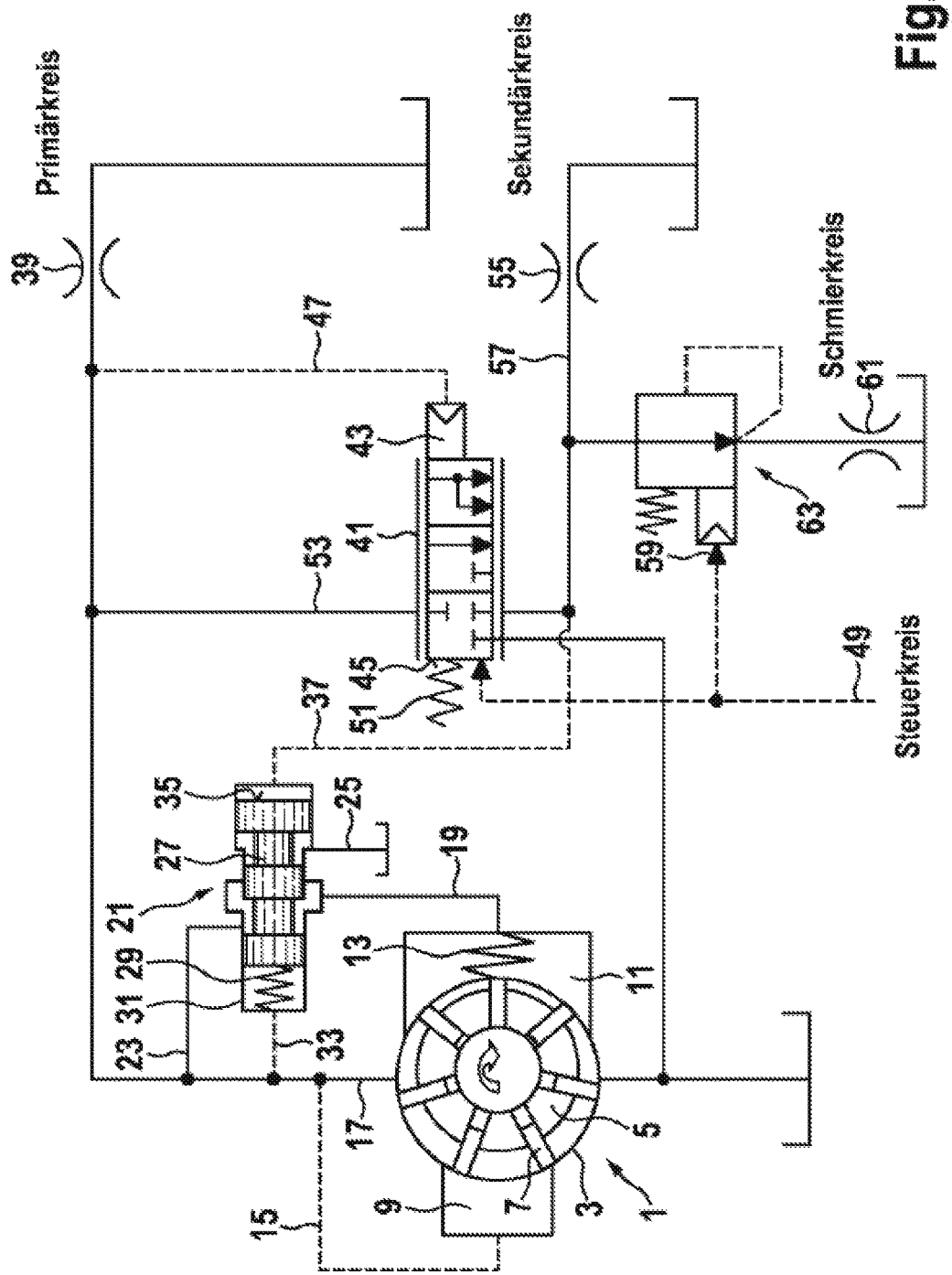
Fig. 1.1
PRIOR ART

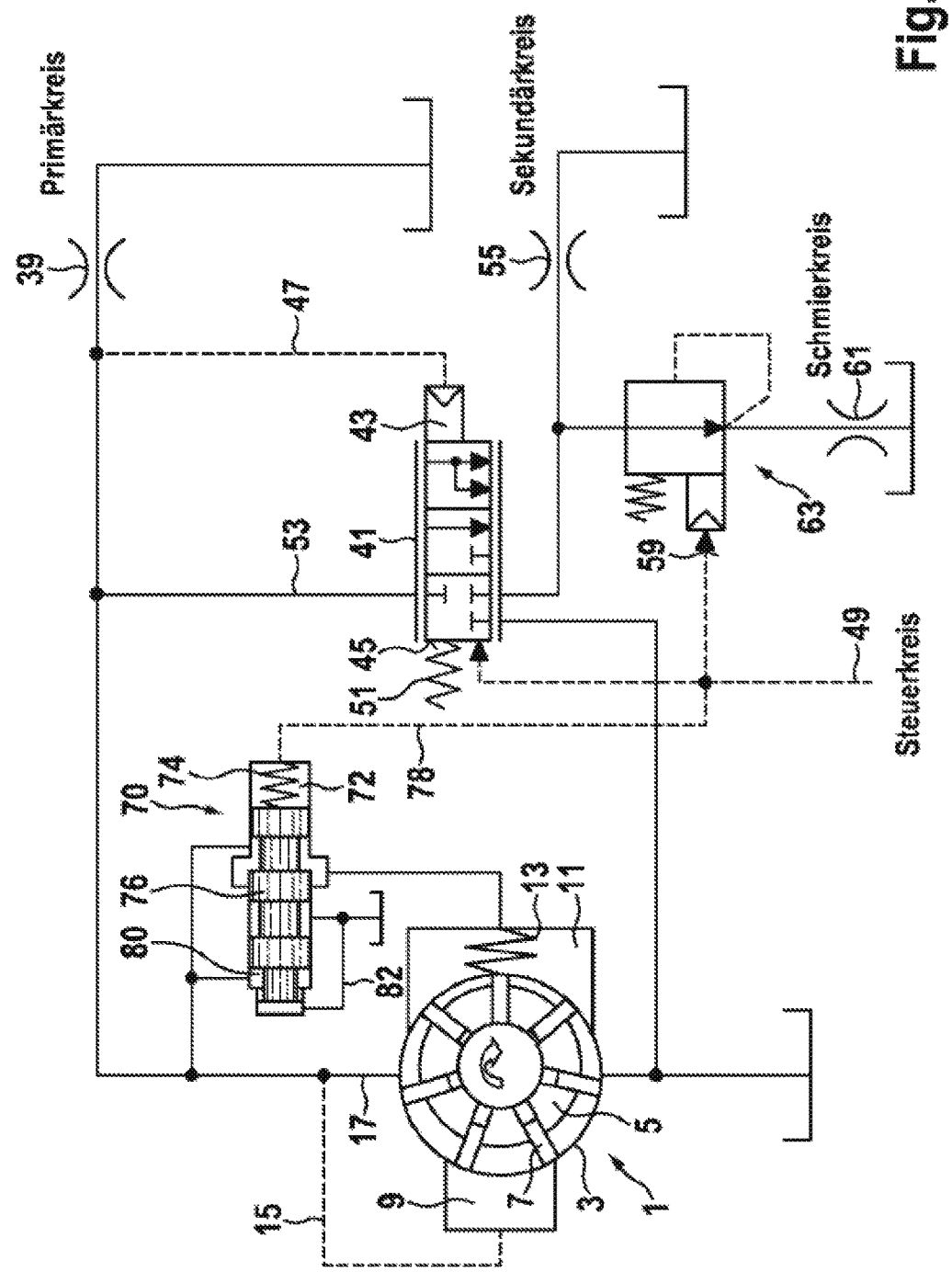
Fig. 1.2
PRIOR ART

VARIABLE DISPLACEMENT PUMP AND GEARBOX CONTROL SYSTEM

CROSS-REFERENCE TO RELATED APPLICATIONS

This application is a U.S. National Stage of International Application No. PCT/EP2014/064002 filed Jul. 1, 2014, which claims the benefit and priority of German Application No. DE102013107180.5 filed Jul. 8, 2013. The entire disclosure of each of the above applications is incorporated herein by reference.

TECHNICAL FIELD

The invention relates to a variable displacement pump for hydraulic transmission controls, in particular vane pump, with variable stroke volume and with a pump controller for outflow pressure control, in the case of which the outlet pressure of the pump in a compensation chamber and a control pressure, which can be set by the pump controller, in a control pressure chamber act on an adjustable stroke ring, wherein the pressure in the control pressure chamber and an additional spring force move the stroke ring in the direction of maximum swiveling out, i.e. maximum stroke volume, and with a transmission control for automatic transmissions which has, among other things, a primary hydraulic circuit for the elements of the transmission which are relevant to the transmission of force and a primary pressure control valve which, upon reaching or exceeding the settable primary pressure, opens a bypass to a secondary hydraulic circuit and, in the event of further exceeding of the primary pressure, has an additional pressure limiting function for the primary pressure, and wherein the secondary hydraulic circuit serves the purpose of cooling and lubrication of the transmission.

BACKGROUND

Variable displacement pumps for hydraulic transmission controls for automatic transmissions are known.

There exist, for example, control circuits in which initially only the primary pressure control valve is active and, upon reaching the set primary pressure, the connection to the secondary hydraulic circuit opens and then the pressure acting in the secondary hydraulic circuit is active on the pump controller so that the pump control is adjusted in the direction of a swiveling-back or downward-regulating pump, i.e. the conveying volume becomes smaller. As a result, what is known as a cascade control or arrangement in series of two controller systems, namely of the primary pressure control valve and of the pump controller which can have an influence counter to one another in their control movements or control characteristics, is created, wherein, due to the downstream secondary pressure action, the pump control becomes active with a time delay after the initial adjustment of the primary pressure by the primary pressure control valve (FIG. 1.1).

Control circuits with a variable displacement pump and an automatic transmission in which a separate control pressure from a control circuit becomes active simultaneously on the pump controller of the variable displacement pump, the primary pressure control valve and, where applicable, a pressure reduction valve in the secondary or lubrication circuit are furthermore known in the prior art. This means that, depending on adjustment, possibly three difference controllers, which are all activated by the same pressure signal variable, intervene simultaneously and thus, depending on their behavior over time, mutually influence one another and can lead to instabilities (FIG. 1.2).

SUMMARY

The object of the invention is therefore to represent a variable displacement pump for hydraulic transmission controls and a transmission control for automatic transmissions which does not have these problems.

The object is achieved by a variable displacement pump for hydraulic transmission controls, in particular vane pump, with variable stroke volume and with a pump controller for outflow pressure control, in the case of which the outlet pressure of the pump in a compensation chamber and a control pressure, which can be set by the pump controller, in a control pressure chamber act on an adjustable stroke ring, wherein the pressure in the control pressure chamber and an additional spring force move the stroke ring in the direction of maximum swiveling out, i.e. maximum stroke volume, and with a transmission control for automatic transmission which has, among other things, a primary hydraulic circuit for elements of the transmission which are relevant to the transmission of force and a primary pressure control valve which, upon reaching or exceeding the settable primary pressure, opens a bypass to a secondary hydraulic circuit and, in the event of further exceeding of the primary pressure, has an additional pressure limiting function for the primary pressure, wherein the secondary hydraulic circuit serves the purpose of cooling and lubricating the transmission, and wherein the control loops or control circuits of the pump control and the transmission (primary pressure) control can be separated from one another and can thus be connected or interconnected independently and individually by an (additional) shift valve.

A further variable displacement pump and transmission control are characterized in that a sensing pressure chamber of the primary pressure control valve for the primary pressure can be activated or deactivated with respect to the primary hydraulic circuit via the inflow of the sensing pressure chamber or via the outflow of the sensing pressure chamber by the shift valve (FIGS. 2 and 3).

A variable displacement pump and transmission control are also preferred in which the secondary hydraulic circuit inflow or the secondary hydraulic circuit connection of the primary pressure control valve can be activated or deactivated by the shift valve (FIG. 4).

A variable displacement pump and transmission control are furthermore preferred in which the inflow or the connection to the pump controller or to the control pressure chamber from the primary pressure circuit or primary hydraulic circuit can be activated or deactivated by the shift valve (FIG. 5).

A further variable displacement pump and transmission control are characterized in that the inflow of the sensing pressure chamber of the primary pressure control valve from the primary hydraulic circuit can be activated or deactivated by the valve and the outflow of the sensing pressure chamber is performed via a hydraulic resistance, e.g. a throttle to a tank or oil sump.

A variable displacement pump and transmission control are also preferred in which the outflow of the sensing pressure chamber to the tank or oil sump can be activated or deactivated by the valve and the inflow of the sensing pressure chamber from the primary hydraulic circuit is performed via a hydraulic resistance, e.g. a throttle.

A variable displacement pump and transmission control are also preferred in which a control pressure of a control pressure circuit of the transmission control acts on a surface of the control pressure chamber of the pump controller (large surface, spring space, upward regulation) and on the shift valve (spring space surface) in a closing direction (FIG. 2, shift valve shifts inflow of the sensing pressure chamber).

A further variable displacement pump and transmission control are characterized in that the control pressure of the transmission control acts on a surface of the control pressure chamber of the pump controller (large surface, spring space, upward regulation) and on the spring space of the shift valve in an opening direction (FIG. 3, outflow of the sensing pressure chamber of the primary pressure control valve).

A variable displacement pump and transmission control are also preferred in which the control pressure of the transmission control acts on a surface of the control pressure chamber of the pump controller (large surface, spring space, upward regulation) and on the spring space of the shift valve in an opening direction (FIG. 4, shift valve shifts inflow to the secondary hydraulic circuit).

A variable displacement pump and transmission control are furthermore characterized in that a control pressure of the transmission control acts on a surface of the control pressure chamber of the pump controller (large surface, spring space, upward regulation) and on the spring space of the primary pressure valve, and the secondary pressure acts in an opening direction on the shift valve (FIG. 5; shift valve controls inflow from primary hydraulic circuit to the pump controller; pump controller performs reduction with primary pressure).

A preferred variable displacement pump and transmission control are also characterized in that the shift valve or the shift valves can be actuated hydraulically and/or electrically.

DRAWINGS

The drawings described herein are for illustrative purposes only of selected embodiments and not all possible implementations, and are not intended to limit the scope of the present disclosure.

FIG. 1.1 shows a variable displacement pump with transmission control according to the prior art.

FIG. 1.2 shows another variable displacement pump with transmission control according to the prior art.

FIG. 2 shows a first embodiment according to the invention of a variable displacement pump with transmission control.

FIG. 3 showed second embodiment according to the invention of a variable displacement pump with transmission control.

DESCRIPTION

Figure 2:
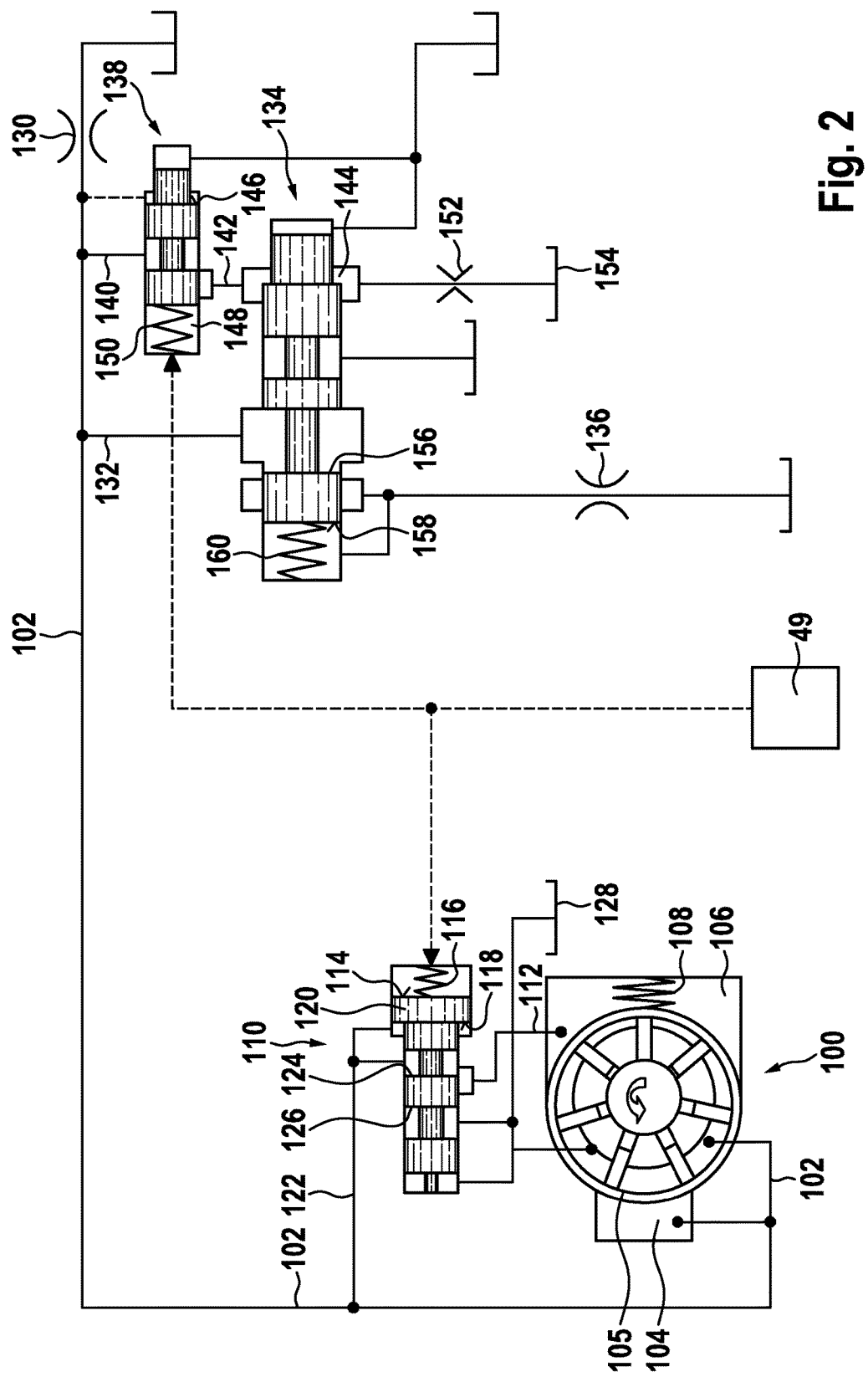

An adjustable vane pump 1 with variable stroke volume and a transmission control for automatic transmissions is represented in FIG. 1. Vane pump 1 with variable stroke volume has a displaceable stroke ring 3 which is represented in its maximally deflected position with respect to a rotor 5. Radially displaceable vanes 7 are arranged in radial slots in rotor 5. The pressure in what is referred to as a compensation chamber 9 acts on displaceable stroke ring 3 in the direct of a swiveling back of stroke ring 3 up to zero conveyance of the pump, on the opposite side, the pressure in what is referred to as a control pressure chamber 11 acts on displaceable stroke ring 3 on a pressure active surface which is larger than the pressure active surface of the compensation chamber, wherein stroke ring 3 acts by means of a spring 13 additionally in the direction of swiveling out 3, i.e. in the direction of the maximum stroke volume of vane pump 1. After switching off the pump and the transmission, spring 13 also acts in the direction of maximum deflection of stroke ring 3 in order to enable an immediate oil supply and a starting of the transmission during starting of the motor vehicle. Compensation chamber 9 is acted upon via a control oil line 15, represented by dashed lines, with line 17 at the pump outlet, i.e. with the maximum pressure which can be generated by the pump. Control pressure chamber 11of adjustable vane pump 1 is connected via a control oil line 19 to a control valve 21, also referred to as a pump controller, wherein the pump controller varies the control pressure in control pressure chamber 11 or in feed line 19 between a pressure from the pump outlet with line 17, which is fed to control valve 21 via line 23, and a tank pressure in a tank line 25. Control valve 21 or the pump controller has a control piston 27 which acts in an openingdirection on one side with a spring 29 and the pressure in a chamber which acts on a small pressure active surface 31 of control piston 27 and which is connected via a control line 33 to the pump outlet pressure region so that control piston 27 connects control pressure chamber 11 initially in an unthrottled manner to the pump outlet pressure in line 17, while the connection of control pressure chamber 11 via control piston 27 to the tank outflow to tank line 25 is shut off. The pressure from a control circuit 49 of the transmission in a control pressure line 37 acts on a large pressure active surface 35 of control valve piston 27, wherein this control pressure is set or varied by the internal program processes of the automatic transmission. The volume flow of the pump from the pump outlet of line 17 leads to a primary hydraulic circuit 39 of the transmission which supplies all the force-relevant elements such as, for example, hydraulically shiftable clutches, brake straps, synchronization devices for gearwheels or adjustable bevel washers and pressure cylinders, for example, for CVT transmissions. When starting the motor vehicle, primary hydraulic circuit 39 is therefore first supplied via pump outlet line 17 with the pump volume flow until a corresponding primary pressure which is required to activate the above-mentioned transmission elements has built up in primary hydraulic circuit 39. A primary pressure control valve 41 remains closed until this operating point. Primary pressure control valve 41 has a hydraulic pressure chamber 43 with a control surface on which the primary pressure can act via a control line 47. On the opposite side, the primary pressure control valve has a hydraulic control surface 45 on which the pressure in control circuit 49 can act and a spring 51 which acts together with the pressure in control circuit 49 in the closing direction on primary pressure control valve 41. If, in primary hydraulic circuit 39, the corresponding primary pressure in pressure chamber 43 of the primary pressure control valve is exceeded to such an extent that it can open primary pressure control valve 41 counter to the pressure in control circuit 49 and spring force 51, a bypass volume flow flows through line 53 to what is referred to as a secondary hydraulic circuit 55 which serves the purpose of cooling and lubricating the corresponding transmission components. The pressure which builds up in said secondary hydraulic circuit 55 in line 57 is also active on pump controller 21 via line 37 and leads, in the case of sufficient volume flow requirement and the corresponding build-ups of pressure caused as a result in the primary and secondary hydraulic circuit, to the pump controller setting a lower control pressure than the pressure at pump outlet 17 in control pressure chamber 11 so that variable displacement pump 1 swivels back in accordance with the only maximally required volume flow requirement. The pressure in control circuit 49 additionally acts on an additional pressure active surface 59 of a pressure reducing valve 63 via which, upon reaching the pressure set there for a lubrication hydraulic circuit 61, a bypass volume flow to said separate lubrication hydraulic circuit 61 is correspondingly throttled. The pressure set at pressure reducing valve 63 is thus changed by the control circuit pressure.

The circuit represented here according to the prior art has the (disadvantageous) function that primary hydraulic circuit 39 must first complete the required pressure build-up and only thereafter does primary pressure control valve 41 open the line to secondary hydraulic circuit 55 so that it is only then that a corresponding control pressure acts on pump controller 21 and pump 1 can swivel back correspondingly to the maximally required volume flow which can be quickly exceeded, for example, in the case of a high rotational speed of pump 1. The pump control itself therefore firstly comes about with a certain time delay and is secondly changed in turn in terms of its actuating variable and possibly disrupted by a potentially opposite control movement of primary pressure control valve 41. This can lead to long time delays and potentially to instabilities in control at various operating points.

A different prior art is represented in FIG. 1.2. Variable displacement pump 1 with its compensation chamber 9, its control pressure chamber 11 and additional spring 19 located therein as well as corresponding lines 15 and 17 correspond to the representation in FIG. 1.1 and should not be mentioned again here in order to avoid repetition. Pump controller 70 itself has a different structure here and is therefore provided with reference number 70. A control pressure space 72, in which a corresponding adjustment spring 74 also sets the base position of control piston 76, is connected by a control pressure line 78 to control circuit 49 and thus to the pressure prevailing in control circuit 49. Control circuit 49 with its pressure acts as in FIG. 1.1 again on surface 45 of primary pressure control valve 41 on which, on the other side of the primary pressure control valve piston, the pressure in primary hydraulic circuit 39 acts, as already described in FIG. 1.1. Moreover, the pressure from control circuit 49 also acts on pressure reducing valve 63 of lubrication hydraulic circuit 61. When the corresponding pressure is reached in the control circuit, this leads to the situation in which at least primary pressure control valve 41, which should open upon the primary pressure being reached, and pump controller 70, which should also swivel back the stroke volume of pump 1 upon the primary pressure being reached, should intervene substantially simultaneously and may mutually influence one another up to instability. Moreover, the control circuit pressure in control circuit 49 additionally acts, in addition to the lubrication circuit pressure, on pressure reducing valve 63 so that a change and potential disruption of the control circuit pressure by additionally connected consumers can also in turn occur here. The pump outlet pressure from pump outlet line 17 acts on pump controller 70 on a small annular surface 80, which pump outlet pressure, upon reaching a maximum pressure set at pump controller 70 and set by spring 74 and the control pressure in control pressure chamber 72, opens a control edge of pump controller 70 to tank outflow 82 and thus an intermediate pressure is set between the pump outlet pressure and the tank pressure in pump control chamber 11.

FIG. 2 represents an arrangement according to the invention of a variable displacement pump with a transmission control. An adjustable vane pump 100, which is represented here with a reverse direction of rotation in comparison to previous FIGS. 1.1 and 1.2, has an outlet line 102 via which a compensation chamber 104 can be acted upon with the pump outlet pressure and as a result can move stroke ring 105 of adjustable vane pump 100 correspondingly into the zero position. On the opposite side of stroke ring 105, a pressure from pump controller 110 acts via a control pressure line 112 in pressure control chamber 106 in the upward regulation direction like upward regulation spring 108. The control valve or pump controller 110 is represented slightly differently in its structure than in the previous figures. Pump controller 110 is connected by its large piston surface 114 in the pressure space, in which spring 116 which acts on control piston 120 is also arranged, to control circuit 49 of the automatic transmission. The pump outlet pressure, i.e. the maximum high pressure from outlet line 102 of vane pump 100 prevailing in the system acts on an annular surface 118 which is active in the opposite direction and is correspondingly smaller. In the position represented in FIG. 2 of control piston 120 of pump controller 110, control pressure chamber 106 of the pump is connected via control line 122, via first control edge 124 and via control pressure line 112 downstream of pump controller 110 to the pump outlet pressure in line 102 and the pump is thus fully regulated upward. If the force of the outlet pressure on annular surface 118 exceeds the force which is generated by the force from control circuit 49 on piston surface 114 and by the force exerted by spring 116, control piston 120 moves against spring 116 to the right and thereby opens a second control edge 126 which additionally connects control pressure line 112 to tank 128. In the case of an automatic transmission, tank 128 is, for example, the oil sump on the base of the automatic transmission. In the case of this return travel of control piston 120, as described above, the control pressure in control pressure chamber 106 is lowered, and the maximal swiveling out of the pump can be reduced by the high pressure in compensation chamber 104. Primary hydraulic circuit 130 of the automatic transmission is to be understood in all cases here as a hydraulic resistance consumer. A bypass line 132 leads from the primary hydraulic circuit to a primary pressure control valve 134. In the case of certain adjustment pressures, primary pressure control valve 134 is able to conduct a bypass volume flow from line 132 into secondary hydraulic circuit 136 which is also represented here symbolically by a hydraulic resistance as a consumer. In this representation, secondary hydraulic circuit 136 and the lubrication circuit are represented in a simplified manner to form a single hydraulic circuit without interconnection of a pressure reducing valve. A shift valve 138 (according to the invention) is additionally arranged in the hydraulic circuit in order to deactivate or activate the function of primary pressure control valve 134. For this purpose, shift valve 138 is arranged between feed lines 140 and 142 which can correspondingly shut or open it, wherein feed line 142 is guided into a sensing pressure chamber 144 of primary pressure control valve 134. If shift valve 138 is shifted into its opening position, which occurs, for example, as a result of a lowering of the control pressure in control pressure circuit 49 which acts on a piston surface of shift valve 138 in a control pressure chamber 148 which also contains a corresponding spring 150 in comparison to an annular surface 146 on which the primary circuit pressure is active via feed line 142, the piston of valve 138 opens the connection between lines 140 and 142 and enables an inflow out of the primary pressure circuit into sensing pressure chamber 144 and thus a pressure build-up in sensing pressure chamber 144 since the outflow out of sensing pressure chamber 144 into a tank 154 or the oil sump of the automatic transmission is limited by a hydraulic resistance 152, for example, in the form of a throttle. Primary pressure control valve 134 can thus open a control edge 156 to secondary hydraulic circuit 136 and conduct a corresponding bypass volume flow out of primary hydraulic circuit 130 or high-pressure line 102 to secondary hydraulic circuit 136 which is active on piston surface 158 in the pressure space with spring 160 of primary pressure valve 134 also for a secondary pressure build-up in secondary hydraulic circuit 136 and thus for an active secondary pressure force. This means that, in this case, separately shiftable valve 138 makes it possible to initially deactivate primary pressure control valve 134 so that only pump controller 110 of variable displacement pump 1 becomes active with its control circuit until setting of the primary pressure. Only in the event of connection of a shift signal, either as a result of a specific level of the control pressure from control pressure circuit 49 and/or where applicable as a result of an external actuator, not represented here, for example, an electromagnet, after pump controller 110 has adjusted vane pump 100 and reached its operating point, primary pressure control valve 134 is activated and can from then take on an additional control function so that, in the case of changes in the volume flow in the primary or secondary hydraulic circuit, a further control change of pump controller 110 no longer requires any large control movements. Large control jumps and thus any potential stimuli towards instability can thus be limited by decoupling the two control circuits from pump controller 110 and primary pressure control valve 134 during starting of the hydraulic system.

Figure 3:
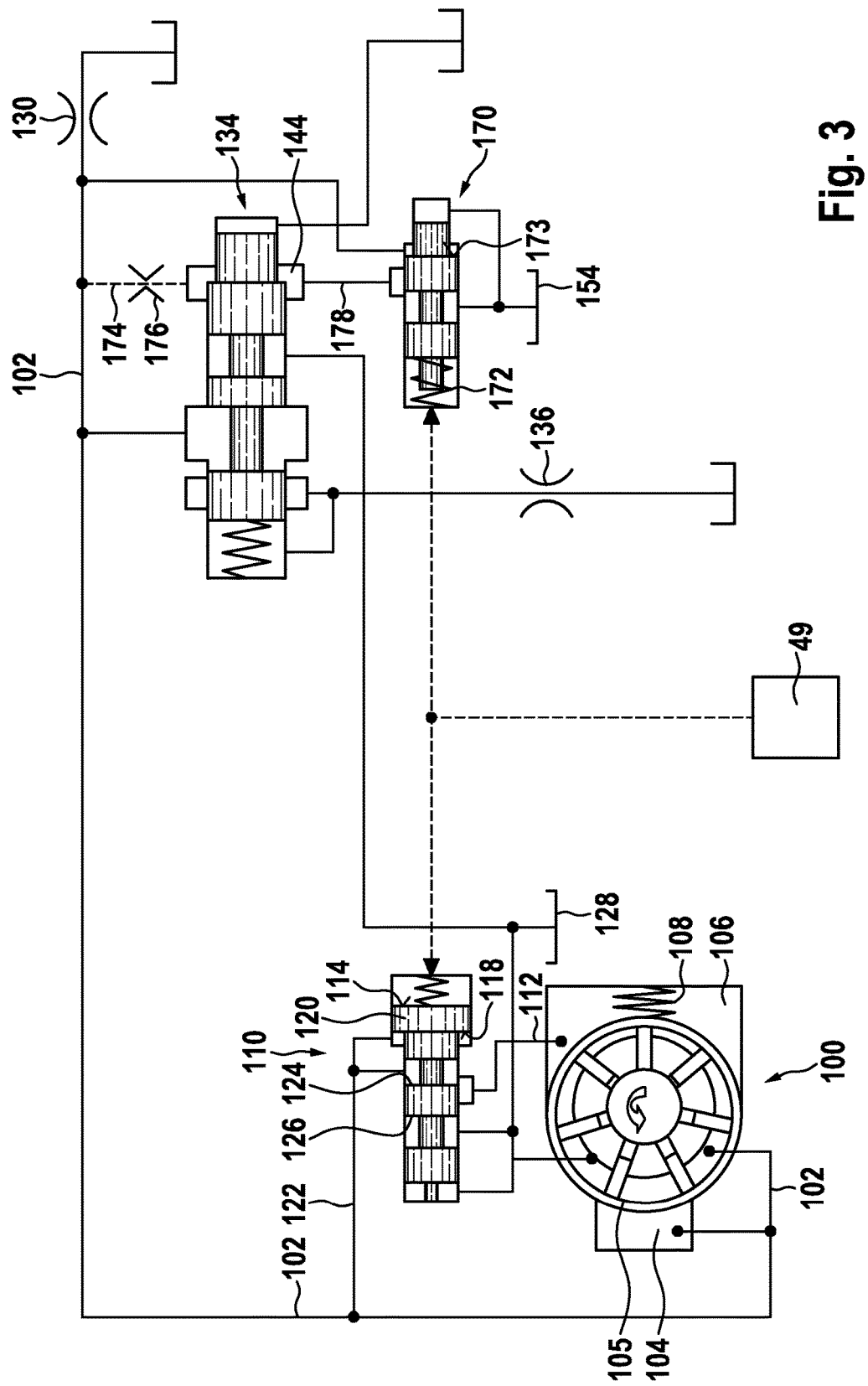

In FIG. 3, both vane pump 100 with its pressure chambers and pump controller 110 as well as primary pressure control valve 134 and primary hydraulic circuit 130, secondary hydraulic circuit 136 and control circuit 49 are arranged and connected to one another as in FIG. 2 so that the same reference numbers and the same description of functions apply to these regions apart from the different arrangement of a shift valve 170. In FIG. 3, shift valve 170 is connected between sensing pressure chamber 144 of primary pressure control valve 134 and tank 154 or the oil sump of the transmission. In this case, shift valve 170 is opened by a spring 172 initially in the depressurized state so that an outflow is carried out from primary hydraulic circuit 130 or high-pressure line 102 via a control line 174 out of this high-pressure or primary pressure region via a hydraulic resistance 176, for example, in the form of a throttle, to sensing pressure chamber 144. Since the connection in outflow 178 to tank 154 is opened by shift valve 170, no significant pressure can build up in sensing pressure chamber 144 which can set in motion or trigger the function of primary pressure control valve 134. Only when shift valve 170 is closed, wherein a corresponding control pressure from control pressure circuit 49 into the pressure space of shift valve 170 with spring 172 counter to the primary pressure which acts on annular surface 173 of shift valve 170 can exceed the corresponding actuating forces, is shift valve 170 closed, and a corresponding build-up of pressure in sensing pressure chamber 144 of primary pressure control valve 134 sets the primary pressure control function in motion.

Figure 4:
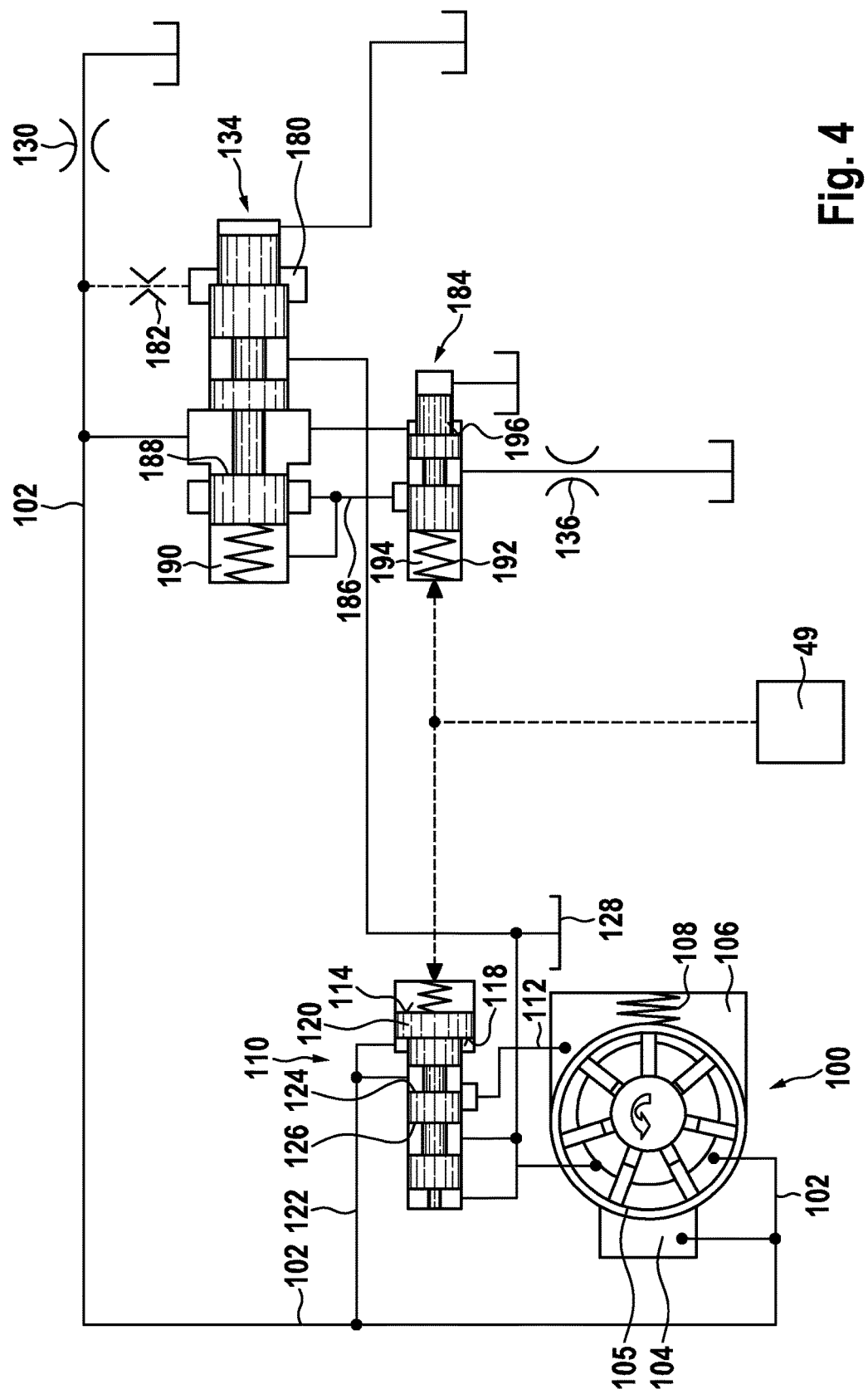
FIG. 4 shows a third embodiment according to the invention of a variable displacement pump with transmission control.

A further arrangement according to the invention of a variable displacement pump with a transmission control is represented in FIG. 4. Both the interconnection of vane pump 100 with its pump controller 110 and also the fundamental arrangement of primary pressure control valve 134, of primary hydraulic circuit 130 and of secondary hydraulic circuit 136 in FIG. 4 are initially identical to those from FIGS. 2 and 3. The difference now lies in the fact that sensing pressure chamber 180 of the primary pressure control valve no longer has any outflow so that the primary pressure in primary hydraulic circuit 130 or in high-pressure line 102 can become active directly via an inflow out of primary hydraulic circuit 130 and only damped or delayed by an attenuator valve 182 by inflow and without outflow. In this circuit diagram, a shift valve 184 is connected between outflow 186 of primary pressure control valve 134 to secondary hydraulic circuit 136. This means that, after the primary pressure set at primary pressure control valve 134 is reached, primary pressure control valve 134 also remains without function as long as valve 184 is closed since, after opening control edge 188, the primary pressure in line 186 shut off from secondary circuit 136 by valve 184 also becomes active in pressure space 190 with the spring of primary pressure valve 134 and thus primary pressure control valve 134 moves control edge 188 back in the direction of the closing position. Only after opening of valve 184 which occurs in that, in control circuit 49, the control pressure on the pressure active surface of pressure chamber 192 together with spring 194 counter to the primary pressure on annular surface 196 can open valve 184, can primary pressure control valve 134 also move into its control position. This means that, in this case too, initially pump controller 110 adjusts the corresponding pressure in primary circuit 130 with vane pump 100 and thereafter, in the case of a corresponding shift signal via shift valve 184, the second control circuit, namely that of primary pressure control valve 134, can be interconnected. The advantages and effects correspond to those which were described above in FIGS. 2 and 3.

Figure 5:
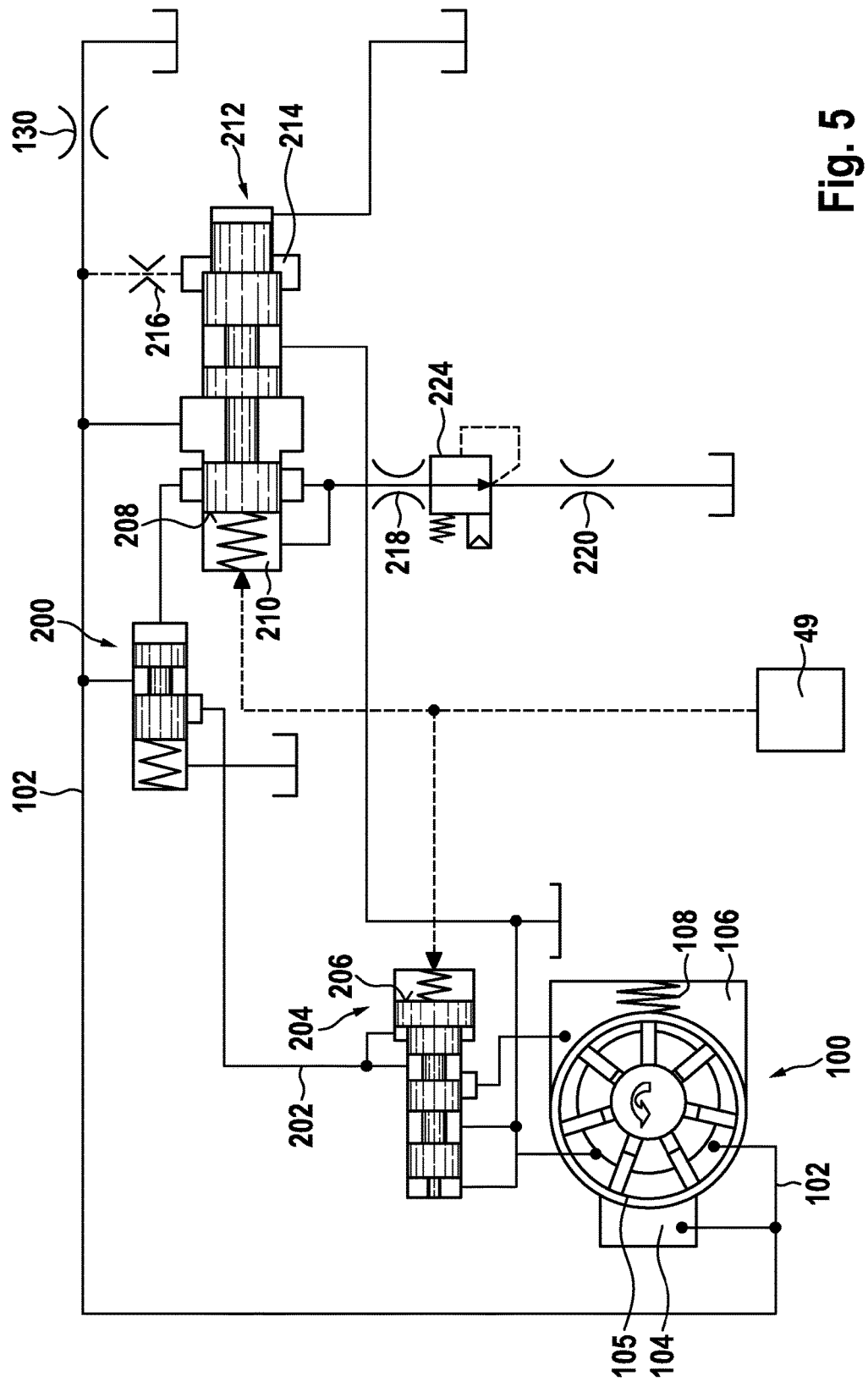
FIG. 5 shows a fourth embodiment according to the invention of a variable displacement pump with transmission control.

A further embodiment according to the invention of a variable displacement pump with a transmission control is represented in FIG. 5 which differs in principle in that here a primary pressure control valve 212 is not initially deactivated during starting of the transmission hydraulics, rather a controller 204 of vane pump 100. Primary pressure control valve 212 therefore forms the controller for the control circuit which firstly occupies its control position, and thereafter additionally pump controller 204 and thus the adjustment of vane pump 100 can be activated via a shift valve 200. The linking, i.e. the connection of vane pump 100 itself to pump controller 204 and also the piston or control edge structure of pump controller 204 remain as described above in FIGS. 2, 3 and 4. The difference lies in the fact that the inflow is carried out via line 202 to pump controller 204 via shift valve 200 which can thus open or shut off the inflow out of high-pressure line 102 or primary hydraulic circuit 130. The control pressure from control circuit 49 otherwise acts as in FIGS. 2, 3 and 4 on large piston surface 206 of pump controller 204 in the spring space of pump controller 204, but in FIG. 5 differently to in FIGS. 2, 3 and 4 directly on piston surface 208 in spring space 210 of primary pressure control valve 212. Here, sensing pressure chamber 214 also possesses only an inflow out of primary pressure circuit 130 via a corresponding attenuator valve 216. In this circuit, secondary hydraulic circuit 218 is separated from lubrication hydraulic circuit 220 via a pressure reducing valve 224.

In the case of direct connection of existing hydraulic transmission controls with a pressure-controlled pump, the function of the prioritizing distribution of the pump conveying quantity (prior art) can lead to control engineering problems.

The prioritization of the oil quantity in the transmission generally initially has the function of preventing inadequate supply of the primary hydraulic circuit. All the elements relevant to the transmission of force in the transmission are supplied via this primary hydraulic circuit. The secondary hydraulic circuit supplies the cooling and lubrication in the transmission, i.e. subordinate functions. One aim of the invention is thus to close the secondary hydraulic circuit in the case of small conveying quantities of the pump.

In known embodiments of prioritization circuits, a primary pressure control valve is used which opens the secondary hydraulic circuit from a specific adjustable primary pressure and closes it again when the primary pressure drops below this pressure level. Mutual influences can arise if this operating point lies too close to the pressure level to be set for the pump. The proposed control systems of the invention solve this conflict.

The solution which achieves the object therefore lies in limiting the control valve types upstream of the consumers, in particular the valves upstream of the consumers for prioritization of the oil quantity, and separation of the two functions of pressure control and prioritization. The circuits which represent this solution are represented, for example, in FIGS. 2 to 5.

Prioritization in these embodiments means that initially the primary hydraulic circuit quantity, then the secondary hydraulic circuit quantity, and then the final volume flow quantity of the variable displacement pump should be adjusted. The aim of the invention is to separate the control variable actuation for the variable displacement pump and for the transmission hydraulics as consumers from one another.

In contrast to the corresponding stability problems in the prior art, as described in FIGS. 1.1 and 1.2, the inventive solutions presented here lead to a shortening of the length of the control loop by temporary switching off of a control loop and thus to the elimination of disruptive mutual influences on the control circuits, in particular their signal flow. All of the functions and consumers of the transmission can thus represent simple disturbance variables for the "variable displacement pump with control valve" controller unit in contrast to control circuits in which prioritization functions for several control loops are connected.

According to the invention, the primary pressure control valves in FIGS. 2 to 5 additionally have the following functions. The control function of the primary pressure control valves is initially activated by the available primary pressure and the primary pressure control valves open a control edge to the secondary hydraulic circuit when a primary pressure level is exceeded.

From now on, a fixed ratio between primary and secondary pressure is adjusted as a result of the return of the secondary pressure to the primary pressure control valve. The control circuit pressure component additionally comes to bear in the case of the primary pressure control in FIG. 5. In the case of a further increase in the primary pressure, a control edge from the primarily hydraulic circuit to the tank is opened, i.e. an additional pressure limiting function comes into force. If the primary pressure control valve is separated by an upstream valve from the primary hydraulic circuit, it only becomes functional when the valve is shifted.

List of reference numbers

| | |
|---|---|
| 1. | Vane pump |
| 3. | Stroke ring |
| 5. | Rotor |
| 7. | Vane |
| 9. | Compensation chamber |
| 11. | Control pressure chamber |
| 13. | Spring |
| 15. | Control oil line |
| 17. | Line |
| 19. | Control oil line |
| 21. | Control valve |
| 23. | Line |
| 25. | Tank line |
| 27. | Control piston |
| 29. | Spring |
| 31. | Pressure active surface |
| 33. | Control line |
| 35. | Pressure active surface |
| 37. | Control pressure line |
| 39. | Primary hydraulic circuit |
| 41. | Primary pressure control valve |
| 43. | Pressure chamber |
| 45. | Control surface |
| 47. | Control line |
| 49. | Control circuit |
| 51. | Spring |
| 53. | Line |
| 55. | Secondary hydraulic circuit |
| 57. | Line |
| 59. | Pressure active surface |
| 61. | Lubrication hydraulic circuit |
| 63. | Pressure reducing valve |
| 70. | Pump controller |
| 72. | Control pressure space |
| 74. | Adjustment spring |
| 76. | Control piston |
| 78. | Control pressure line |
| 80. | Annular surface |
| 82. | Tank outflow |
| 100. | Vane pump |
| 102. | Outlet line |
| 104. | Compensation chamber |
| 105. | Stroke ring |
| 106. | Control pressure chamber |
| 108. | Upward regulation spring |
| 110. | Pump controller |
| 112. | Control pressure line |
| 114. | Piston surface |
| 116. | Spring |
| 118. | Annular surface |
| 120. | Control piston |
| 122. | Control line |
| 124. | Control edge |
| 126. | Control edge |
| 128. | Tank |
| 130. | Primary hydraulic circuit |
| 132. | Bypass line |
| 134. | Primary pressure control valve |
| 136. | Secondary hydraulic circuit |
| 138. | Shift valve |
| 140. | Feed line |
| 142. | Feed line, inflow |
| 144. | Sensing pressure chamber |
| 146. | Annular surface |
| 148 | Control pressure chamber |
| 150. | Spring |
| 152. | Resistance |
| 154. | Tank |
| 158. | Piston surface |
| 160. | Spring |
| 170. | Shift valve |
| 172. | Spring |
| 173. | Annular surface |
| 174. | Control line |
| 176. | Resistance |
| 178. | Outflow |
| 180. | Sensing pressure chamber |
| 182. | Attenuator valve |
| 184. | Shift valve |

-continued

List of reference numbers

| | |
|---|---|
| 186. | Outflow/line |
| 188. | Control edge |
| 196. | Annular surface |
| 200. | Shift valve |
| 204. | Controller/pump controller |
| 206. | Piston surface |
| 208. | Piston surface |
| 210. | Spring space |
| 212. | Primary pressure control valve |
| 214. | Sensing pressure chamber |
| 216. | Attenuator valve |
| 218. | Secondary hydraulic circuit |
| 224. | Pressure reducing valve |

The invention claimed is:

1. A variable displacement vane pump for hydraulic transmission controls, with variable stroke volume and with a pump controller configured to set an outlet pressure of the variable displacement vane pump in a compensation chamber and a control pressure of the variable displacement vane pump in a control pressure chamber, wherein the outlet pressure in the compensation chamber and the control pressure in the control pressure chamber act on an adjustable stroke ring, wherein pressure in the control pressure chamber and an additional spring force move the adjustable stroke ring in a direction of maximum swiveling out to a maximum stroke volume, and with a transmission control for an automatic transmission which has a primary hydraulic circuit and a primary pressure control valve which, upon reaching or exceeding an adjustable primary pressure, opens a bypass to a secondary hydraulic circuit and, in the event of further exceeding the adjustable primary pressure, has an additional pressure limiting function for the adjustable primary pressure, wherein the secondary hydraulic circuit serves the purpose of cooling and lubrication of the automatic transmission, and wherein control circuits of the pump controller and the transmission control are configured to be separated from and reconnected to one another and thus are activated or interconnected independently and individually by a shift valve.

2. The variable displacement pump and transmission control as claimed in claim 1, wherein the shift valve is configured to fluidly connect and disconnect a sensing pressure chamber of the primary pressure control valve and the primary hydraulic circuit via an inflow of the sensing pressure chamber or via an outflow of the sensing pressure chamber.

3. The variable displacement pump and transmission control as claimed in claim 2, wherein an inflow of the sensing pressure chamber of the primary pressure control valve from the primary hydraulic circuit is congfigured to be activated or deactivated by the shift valve and an outflow of the sensing pressure chamber is performed via a hydraulic resistance or a throttle to a tank or an oil sump.

4. The variable displacement pump and transmission control as claimed in claim 2, wherein the shift valve is configured to connect and disconnect the sensing pressure chamber to a tank or an oil sump and the inflow of the sensing pressure chamber from the primary hydraulic circuit is performed via a hydraulic resistance or a throttle.

5. The variable displacement pump and transmission control as claimed in claim 2, wherein a control pressure of a control circuit of the transmission control acts on a piston surface of the pump controller and on the shift valve in a closing direction.

6. The variable displacement pump and transmission control as claimed in claim 2, wherein the control pressure of a control circuit of the transmission control acts on a piston surface of the pump controller and on a spring space of the shift valve in an opening direction.

7. The variable displacement pump and transmission control as claimed in claim 1, wherein the shift valve is configured to fluidly connect and disconnect the secondary hydraulic circuit and the primary pressure control valve.

8. The variable displacement pump and transmission control as claimed in claim 7, wherein the control pressure of a control circuit of the transmission control acts on a piston surface of the pump controller and on a spring space of the shift valve in an opening direction.

9. The variable displacement pump and transmission control as claimed in claim 1, wherein the shift valve is configured to connect and disconnect the control pressure chamber and the primary hydraulic circuit.

10. The variable displacement pump and transmission control as claimed in claim 9, wherein a control pressure of a control circuit of the transmission control acts on a piston surface of the pump controller and on the piston surface of the primary pressure control valve, and a secondary pressure acts in an opening direction on the shift valve such that the shift valve controls inflow from the primary hydraulic circuit to the pump controller; and the pump controller is configured to provide a primary pressure reduction.

11. The variable displacement pump and transmission control as claimed in claim 1, wherein the shift valve is actuated hydraulically.

12. A hydraulic transmission control system, comprising:
a variable displacement vane pump including a stoke ring, a rotor rotatably disposed in the stroke ring, a plurality of vanes moveably connected to the rotor for moving fluid within the stroke ring, and an outlet line for receiving fluid from within the stroke ring;
a control pressure chamber defined adjacent to a first side of the stroke ring for adjusting the position of the stroke ring relative to the rotor based on a fluid pressure in the control pressure chamber for varying a displaced volume in the stroke ring and a pump outlet pressure during rotation of the rotor;
a spring disposed in the control pressure chamber and biasing the stroke ring in a maximum stroke volume position;
a compensation chamber defined adjacent to a second side of the stroke ring for adjusting the position of the stroke ring relative to the rotor based on a fluid pressure in the compensation chamber for varying a displaced volume in the stroke ring and the pump outlet pressure during rotation of the rotor;
a pump controller fluidly connected to the outlet line and the control pressure chamber and configured to adjust a pressure in the control pressure chamber;
the outlet line further fluidly connected to the compensation chamber;
a primary hydraulic circuit for an automatic transmission being fluidly connected to the outlet line;
a primary pressure control valve fluidly connected to the outlet line;
a secondary hydraulic circuit fluidly connected to the primary pressure control valve and for cooling and lubricating the automatic transmission;

a bypass line fluidly connecting the primary pressure control valve and the secondary hydraulic circuit; and a shift valve disposed between the outlet line and the primary pressure control valve and configured to selectively open and close the bypass line for connecting and disconnecting the pump controller and the primary pressure control valve.

* * * * *